(12) United States Patent
Takiguchi et al.

(10) Patent No.: US 6,804,433 B2
(45) Date of Patent: Oct. 12, 2004

(54) OPTICAL PULSE PATTERN GENERATOR

(75) Inventors: Koichi Takiguchi, Atsugi (JP); Tomohiro Shibata, Zama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 120 days.

(21) Appl. No.: 10/335,990

(22) Filed: Jan. 3, 2003

(65) Prior Publication Data

US 2003/0128923 A1 Jul. 10, 2003

(30) Foreign Application Priority Data

Jan. 10, 2002 (JP) ........................................ 2002-003136

(51) Int. Cl.$^7$ .......................... G02B 6/26; H04B 10/00; G02F 3/00
(52) U.S. Cl. ........................ 385/27; 398/161; 359/107; 359/108
(58) Field of Search ..................... 385/27, 39; 398/161; 359/107, 108

(56) References Cited

U.S. PATENT DOCUMENTS

| | | | |
|---|---|---|---|
| 5,155,779 A | 10/1992 | Avramopoulos et al. | |
| 5,165,077 A | * 11/1992 | Rokugawa et al. | ......... 398/101 |
| 5,208,705 A | 5/1993 | Avramopoulos et al. | |
| 2002/0018256 A1 | * 2/2002 | Child | ........................ 359/107 |

FOREIGN PATENT DOCUMENTS

| | | |
|---|---|---|
| JP | 6-75264 A | 3/1994 |
| JP | 7-281215 A | 10/1995 |

OTHER PUBLICATIONS

Keishi Habara et al., "Large–capacity WDM Packet Switching", Springer Photonic Networks (G. Prati Ed.), 1997.
R.J.S. Pedersen et al., "10Gbit/s repeaterless transmission over 250km standard fibre", Electronics Letters, Nov. 7, 1996, vol. 32, No. 23, pp. 2155–2156.

* cited by examiner

*Primary Examiner*—Frank G. Font
*Assistant Examiner*—Michael P. Mooney
(74) *Attorney, Agent, or Firm*—Venable LLP; Michael A. Sartori

(57) ABSTRACT

An optical pulse pattern generator can generate optical pulse signals with various periods and patterns. It supplies an optical pulse from an optical pulse source to a variable optical delay line circuit including cascade-connected characteristic-variable asymmetrical Mach-Zehnder interferometers via an optical combiner and splitter. The optical pulse is fed back to the optical combiner and splitter from the final stages of the cascade-connected characteristic-variable a symmetrical Mach-Zehnder interferometers via an optical exclusive OR circuit and optical amplifier. Making directional couplers with variable coupling ratio, and directional couplers with variable coupling ratio in operation can cause the final stage of the cascade-connected characteristic-variable asymmetrical Mach-Zehnder interferometer to produce a random pulse train.

12 Claims, 10 Drawing Sheets

OPTICAL PULSE PATTERN GENERATOR

This application claims priority from Japanese Patent Application No. 2002-003136 filed Jan. 10, 2002, which is incorporated hereinto by reference.

BACKGROUND OF THE INVENTION

1. Field of the Invention

The present invention relates to an optical pulse pattern generator, and more particularly to an optical pulse pattern generator capable of generating a pulse train for optical labeling and an optical random pattern pulse train for device evaluation in an optical communication field.

2. Description of the Related Art

As optical communication systems increase their capacity, high-speed transmission systems with a bit rate of 40 Gb/s per channel is nearing practical use. In addition, major carriers and vendors in the U.S., Europe and Japan promote research and development of next generation ultrahigh-speed transmission systems with a bit rate of 100 Gb/s or more per channel. Furthermore, intensive research and development of optical network systems that carry out all-optical routing of optical signals have been conducted. It is essential for a high-speed transmission system to evaluate the optical system and devices using high-speed optical random pattern pulse train, and for an optical network system to generate a high-speed label pulse train for optical packets.

FIG. 1 shows a conventional optical pulse pattern generator used for the foregoing purposes. In the optical pulse pattern generator shown in FIG. 1, an optical pulse train with a period T from an optical pulse source 1 is supplied to an input 2, and is split by an optical splitter 3. Then, individual optical pulses pass through optical waveguides 4-1 to 4-N, where N is an integer greater than one, and are led to optical switches 5-1 to 5-N. The optical pulses pass through only optical switches in a bar state among the optical switches 5-1 to 5-N to be led to the delay lines 6-1 to 6-N, and are coupled by optical combiners 7 to be output from an output 8. In this case, if length differences of the delay lines 6-1 to 6-N increase step by step by an amount of cT/(nN) in this order, an optical random pattern pulse train with a period T and a sequence length N is generated, where c is the light speed in the vacuum, and n is the group refractive index of the delay lines. The optical random pattern pulse train corresponds to the bar state (1) or a cross state (0) in each of optical switches.

Therefore to generate the optical random pattern pulse train with the period T and sequence length N, the foregoing conventional method must include N optical switches and N delay lines, thereby complicating the configuration because of an increase in the number of components and the size thereof. In addition, it requires 1×N optical splitter 3 and N×1 optical combiner 7, thereby increasing the loss.

For example, "Large-capacity WDM packet switching" K. Habara et al., Springer Photonic Networks (G. Prati Ed.), 1997 discloses in pp.285 to 299 a method of repeatedly launching optical pulses onto an optical device composed of an optical combiner and splitter, a delay line array and an optical switch array. However, it requires the same number of the delay lines and switches as the sequence length needed. Accordingly, its size increases and its configuration becomes complicated at a typical sequence length. In addition, since the number of the input ports of the combiner and that of the output ports of the splitter must also be equal to the sequence length, its loss increases with an increase in the sequence length.

Furthermore, R. J. S. Pedersen, B. F. Jorgensen, M. Nissov and He Yongqi, "10 Gbit/s repeaterless transmission over 250 km standard fibre" ELECTRONICS LETTERS, 7th Nov. 1996, Vol. 32, No. 23 discloses in pp.2155 to 2156, a method of modulating CW light by driving an optical modulator by an electric pulse pattern. However, it is difficult for it to generate a pulse pattern beyond 40 Gb/s because of the limit of the operation speed of the pulse pattern generator in an electrical region.

Furthermore, U.S. Pat. No. 5,208,705 discloses a method of utilizing a feedback shift register composed of an optical exclusive OR circuit based on nonlinear optical effect in combination with an optical fiber fixed delay lines. However, since it must use two types of optical pulses (clock pulse and control pulse), its configuration becomes large and complicated. In addition, using the nonlinear optical effect imposes some conditions on the operable optical pulse intensity, and makes its operation unstable. Furthermore, using optical fiber fixed delay lines makes it difficult to adjust the delay line length accurately, and to vary the pulse pattern, pulse period or bit rate.

As described above, no effective high-speed optical pulse train generating means are reported up to now. Consequently, implementing a small, stable all-optical pulse pattern generator that is not governed by the speed of electric components has been expected.

SUMMARY OF THE INVENTION

The present invention is implemented to solve the foregoing problems. It is therefore an object of the present invention to provide an optical pulse pattern generator with a simple configuration and low loss.

According to a first aspect of the present invention, there is provided an optical pulse pattern generator comprising: an optical pulse source for generating an optical pulse; an optical combiner and splitter having two inputs and two outputs, a first input of the two inputs of which is connected to the optical pulse source; a variable optical delay line circuit having two inputs and two outputs and including a plurality of cascade-connected characteristic-variable asymmetrical Mach-Zehnder interferometers each of which has two inputs and two outputs, a first output of one of the cascade-connected characteristic-variable asymmetrical Mach-Zehnder interferometers being connected to a first input of another of the cascade-connected characteristic-variable asymmetrical Mach-Zehnder interferometers to form a cascade connection therebetween, and a first input of the variable optical delay line circuit being connected to a first output of the optical combiner and splitter; and one or more optical exclusive OR circuits, and inputs of the optical exclusive OR circuits being connected to second outputs of the cascade-connected characteristic-variable asymmetrical Mach-Zehnder interferometers respectively, wherein a first output of the optical exclusive OR circuits is connected to a second input of the optical combiner and splitter.

Here, the optical exclusive OR circuits may be cascaded.

Each of the optical exclusive OR circuis may have two inputs and two outputs, and the number of the optical exclusive OR circuits may be less than the number of the cascade-connected characteristic-variable asymmetrical Mach-Zehnder interferometers by one.

Each of the cascade-connected characteristic-variable asymmetrical Mach-Zehnder interferometers may include at least one characteristic-variable asymmetrical Mach-Zehnder interferometer comprising: a first directional coupler with variable coupling ratio having two inputs and two outputs; and a second directional coupler with variable coupling ratio having two inputs and two outputs connected to the first directional coupler with variable coupling ratio through two optical waveguides with different lengths.

A first output of one of the characteristic-variable asymmetrical Mach-Zehnder interferometers may be connected to a first input of another of the characteristic-variable asymmetrical Mach-Zehnder interferometers to form a cascade connection of the two as each of the cascade-connected characteristic-variable asymmetrical Mach-Zehnder interferometers.

One of the first and second directional couplers with variable coupling ratio may be used in common by two of the characteristic-variable asymmetrical Mach-Zehnder interferometers.

The optical pulse pattern generator may further comprise at least one optical amplifier at a position on a light path.

The optical combiner and splitter may consist of a symmetrical Mach-Zehnder interferometer.

Each of the optical exclusive OR circuits may consist of a symmetrical Mach-Zehnder interferometer.

The optical pulse pattern generator may further comprise an optical gating device connected to an output of one of the variable optical delay line circuit, the optical combiner and splitter and the optical exclusive OR circuits.

According to a second aspect of the present invention, there is provided an optical pulse pattern generator comprising: an optical pulse source for generating an optical pulse; an optical combiner and splitter connected to an output of the optical pulse source; a variable optical delay line circuit connected to the optical combiner and splitter; and one or more optical exclusive OR circuits connected to the variable optical delay line circuit at intermediate stages and a final stage of the variable optical delay line circuit, wherein one output of the optical exclusive OR circuits is connected to the optical combiner and splitter.

According to a third aspect of the present invention, there is provided an optical pulse pattern generating method of generating an optical random pattern pulse train from an optical pulse, the optical pulse pattern generating method comprising the steps of: launching an optical pulse produced by an optical pulse source to a variable optical delay line circuit via an optical combiner and splitter, the variable optical delay line circuit including a plurality of cascade-connected characteristic-variable asymmetrical Mach-Zehnder interferometers; supplying an optical pulse output from each of the cascade-connected characteristic-variable asymmetrical Mach-Zehnder interferometers to the optical combiner and splitter through one or more optical exclusive OR circuits; and producing a random pulse train from one of the variable optical delay line circuit, the optical combiner and splitter and the optical exclusive OR circuits by using the optical pulse supplied to the optical combiner and splitter.

According to the present invention, the output of the optical pulse source is connected to the variable optical delay line circuit via the optical combiner and splitter. The variable optical delay line circuit feeds back from its intermediate or final stage the optical pulse to the optical combiner and splitter via the optical exclusive OR circuits. The configuration can implement a linear feedback shift register in the optical region. Adjusting the length of the variable optical delay line circuit makes it possible to generate optical random pattern pulse trains with various periods and patterns, thereby being able to realize the optical pulse pattern generator.

Furthermore, the optical pulse pattern generator in accordance with the present invention, by applying the variable linear feedback shift register configuration in the optical region, can generate the optical pulse patterns with various periods and patterns with a small size, low loss, integrated configuration without using a high-speed intensity modulator.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
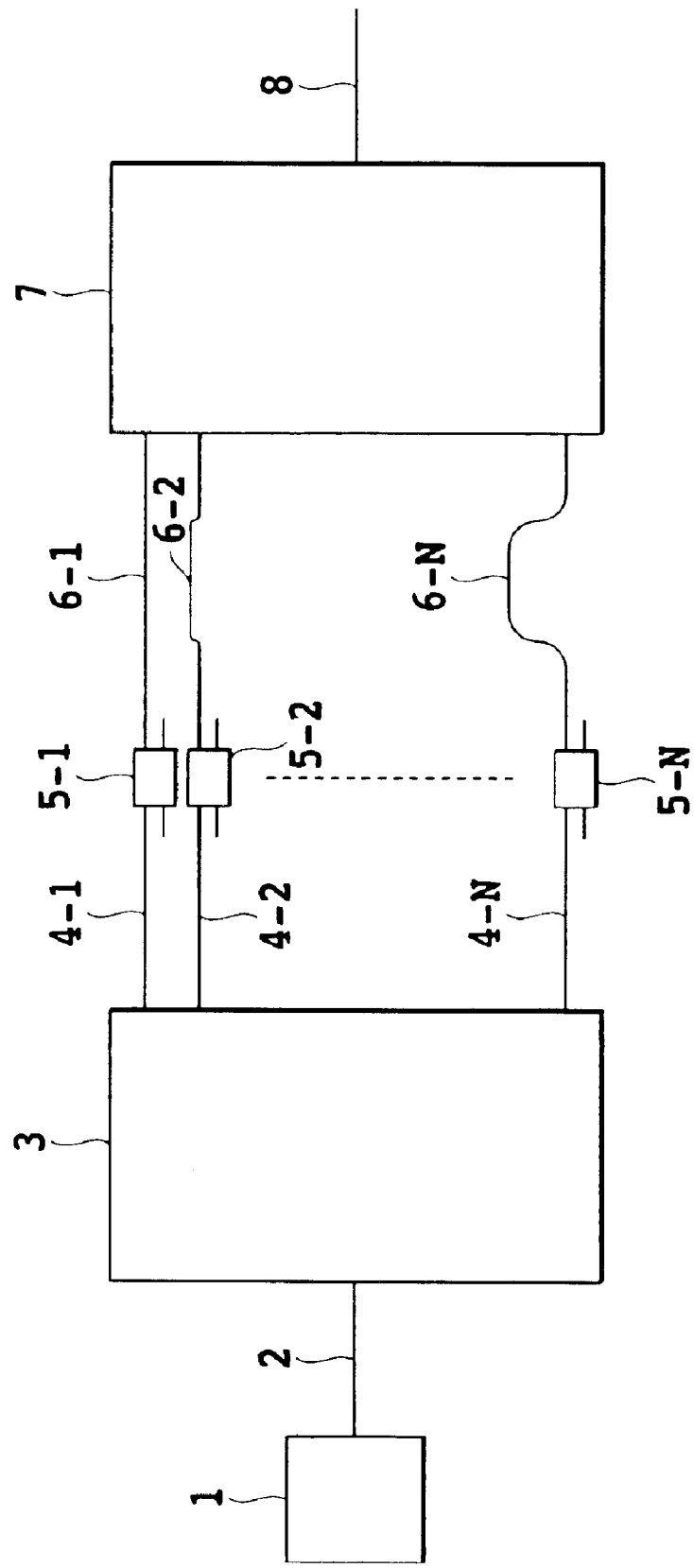
FIG. 1 is a block diagram showing a configuration of a conventional optical pulse pattern generator.
Figure 2:
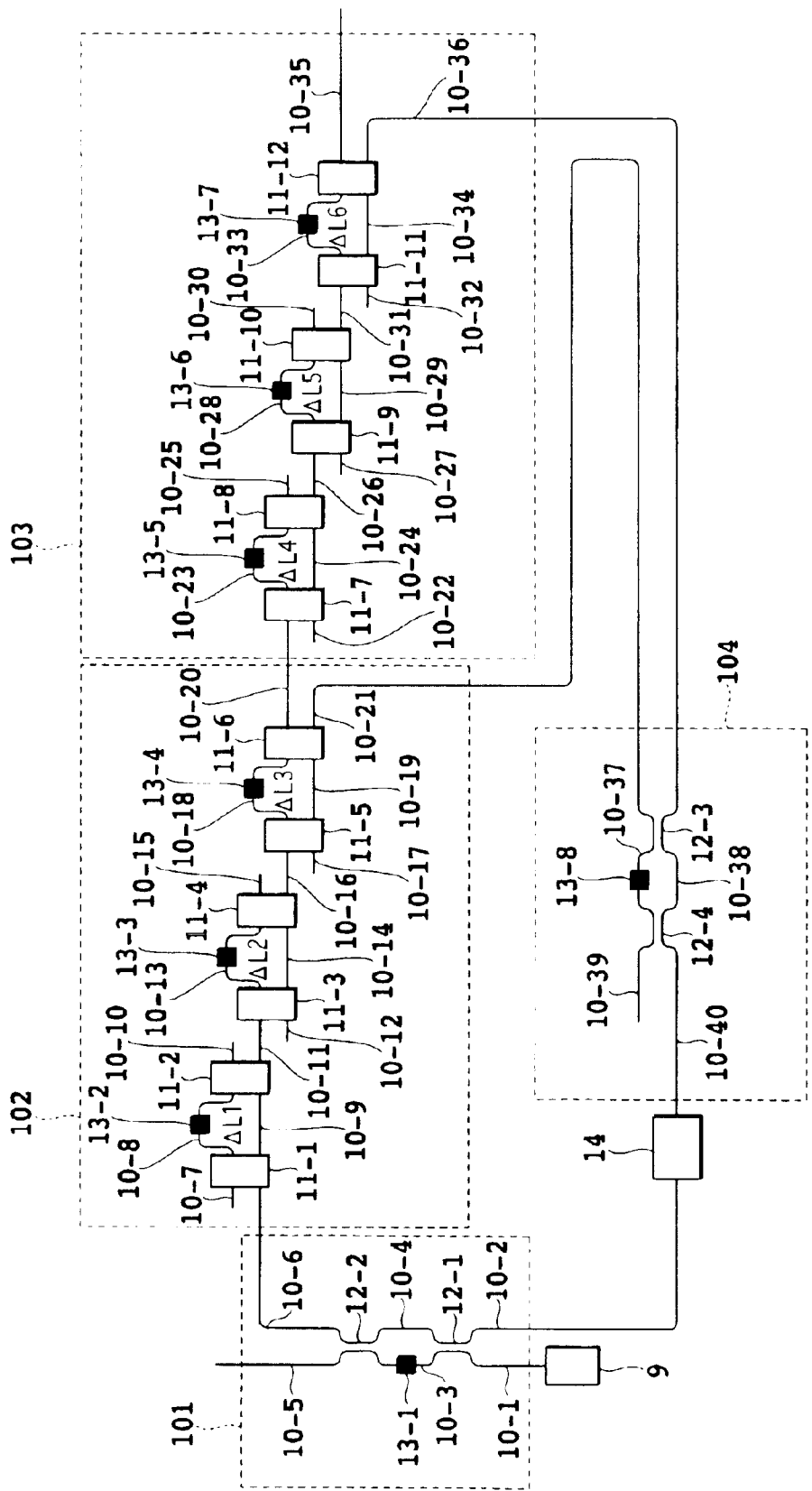
FIG. 2 is a block diagram showing a configuration of a first embodiment of the optical pulse pattern generator in accordance with the present invention.

The invention will now be described with reference to the accompanying drawings.
First Embodiment FIG. 2 shows a first embodiment in accordance with the present invention. As shown in this figure, the present embodiment of the optical pulse pattern generator comprises an optical pulse source 9, optical waveguides 10-1 to 10-40, directional couplers 11-1 to 11-12 with variable coupling ratio, 3-dB directional couplers 12-1 to 12-4, waveguide refractive index control sections 13-1 to 13-8, and an optical amplifier 14.

In the present embodiment, the output of the optical pulse source 9 is connected to a cascade connection of a first symmetrical Mach-Zehnder interferometer used as an optical combiner and splitter 101, and first and second cascade-connected characteristic-variable asymmetrical Mach-Zehnder interferometers 102 and 103. The two cascade-connected characteristic-variable asymmetrical Mach-Zehnder interferometers 102 and 103 have their final stages connected to the first symmetrical Mach-Zehnder interferometer 101 via a second symmetrical Mach-Zehnder interferometer used as an optical exclusive OR circuit 104 and via the optical amplifier 14, thereby constituting a feedback loop. The number of stages of each of the cascade-connected characteristic-variable asymmetrical Mach-Zehnder interferometers 102 and 103, that is, the number of the characteristic-variable asymmetrical Mach-Zehnder interferometers, is three.

Cascading the two two-input/two-output cascade-connected characteristic-variable asymmetrical Mach-Zehnder interferometers 102 and 103 can constitute a two-input/two-output variable optical delay line circuit. Specifically, connecting a first output port of the previous cascade-connected characteristic-variable asymmetrical Mach-Zehnder interferometer 102 with a first input port of the subsequent cascade-connected characteristic-variable asymmetrical Mach-Zehnder interferometer 103 in series constitutes the two-input/two-output variable optical delay line circuit.

The optical pulse source 9 is connected to a first input port of the optical combiner and splitter 101 via the optical waveguide 10-1. A first output port of the optical combiner and splitter 101 is connected to a first input port of the variable optical delay line circuit (cascade-connected characteristic-variable asymmetrical Mach-Zehnder interferometer 102) via the optical waveguide 10-6. A second output port of the cascade-connected characteristic-variable asymmetrical Mach-Zehnder interferometer 102 and a first output port of the cascade-connected characteristic-variable asymmetrical Mach-Zehnder interferometer 103 are both connected to input ports of the optical exclusive OR circuit 104 via the optical waveguides 10-21 and 10-36. A first output port of the optical exclusive OR circuit 104 is connected to a second input port of the optical combiner and splitter 101 via the optical waveguide 10-40, optical amplifier 14 and optical waveguide 10-2. In FIG. 2, the optical waveguide is an open output port (output).

Incidentally, a second output port of the cascade-connected characteristic-variable asymmetrical Mach-Zehnder interferometer 103 can be connected to the input port of the optical exclusive OR circuit 104 via the optical waveguide 10-35 to use the optical waveguide 10-36 as an open output port (output).

The cascade-connected characteristic-variable asymmetrical Mach-Zehnder interferometers 102 and 103 each include three characteristic-variable asymmetrical Mach-Zehnder interferometers. Each characteristic-variable asymmetrical Mach-Zehnder interferometer includes a pair of two-input/two-output directional couplers with variable coupling ratio connected in cascade. More specifically, the input side two-input/two-output directional coupler with variable coupling ratio (11-1, for example) has its two output ports connected to the two input ports of the output side two-input/two-output directional coupler with variable coupling ratio (11-2, for example) via the two optical waveguides (10-8 and 10-9, for example) with different length. Then, the previous characteristic-variable asymmetrical Mach-Zehnder interferometer has its first output port connected in series to the first input port of the subsequent characteristic-variable asymmetrical Mach-Zehnder interferometer.

The two cascade-connected characteristic-variable asymmetrical Mach-Zehnder interferometers 102 and 103 can be arranged into a single characteristic-variable asymmetrical Mach-Zehnder interferometer.

Figure 3:
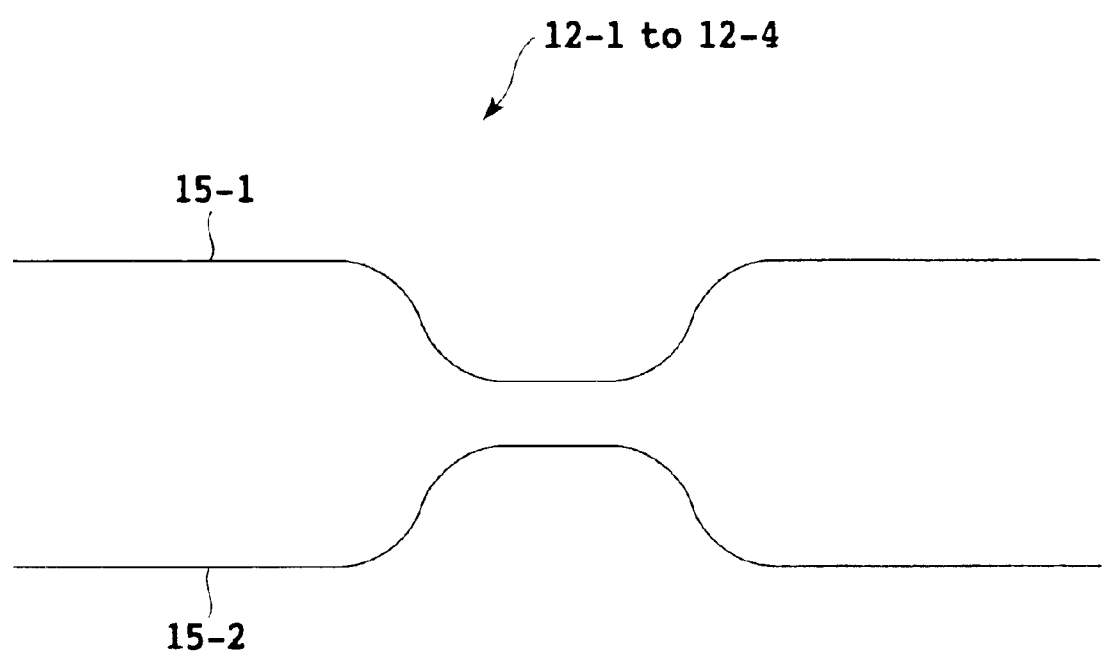
FIG. 3 is a block diagram showing a configuration of a 3 dB directional coupler.

The 3-dB directional couplers 12-1 to 12-4 are each composed of two optical waveguides 15-1 and 15-2 of several micrometer square that are placed side by side in close proximity in the order of a few micrometers as shown in FIG. 3, such that a 50% power coupling is achieved by adjusting the length of the proximate section (coupling length). In the proximate type 3-dB directional coupler, the phase of a transmitted wave is shifted by $\pi/2$ from that of a reflected wave. The 3-dB directional coupler can also be formed using an MMI (multimode interference) coupler configuration.

Figure 4A:
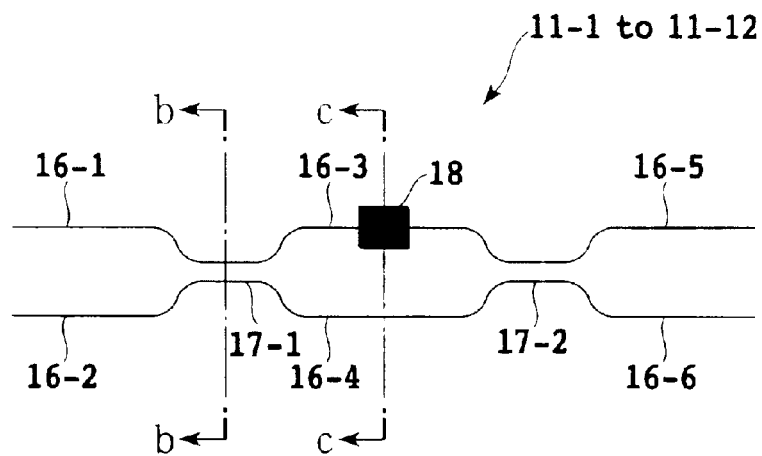
FIGS. 4A to 4C are views showing a configuration of a directional coupler with variable coupling ratio.

The directional couplers with variable coupling ratio 11-1 to 11-12 can be composed of a symmetrical Mach-Zehnder interferometer as shown in FIG. 4A. The directional couplers with variable coupling ratio 11-1 to 11-12 each include optical waveguides 16-1 to 16-6, 3-dB directional couplers 17-1 and 17-2, and a waveguide refractive index control sections 18.

Figure 4B:
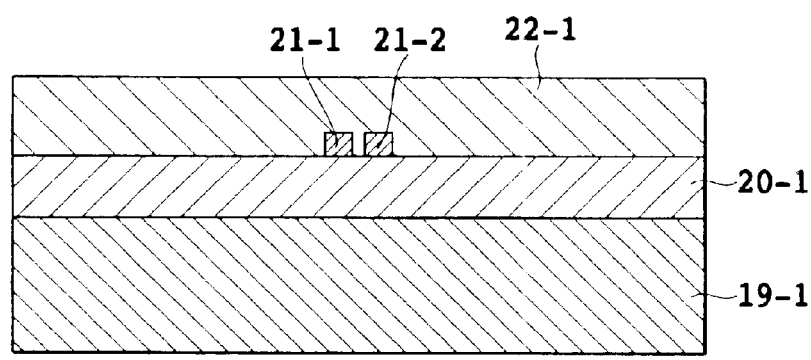
Figure 4C:
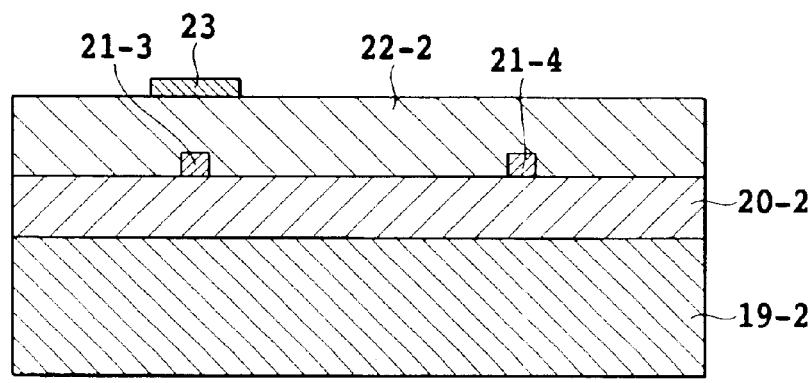

FIGS. 4B and 4C are cross-sectional views taken along lines b—b and c—c of FIG. 4A, respectively, in which the directional coupler with variable coupling ratio is composed of silica glass waveguides.

As shown in FIG. 4B, the directional couplers with variable coupling ratio 11-1 to 11-12 each include at the b-b cross section a silicon substrate 19-1, an under cladding 20-1 and an over cladding 22-1 stacked in this order. In the over cladding 22-1, cores 21-1 and 21-2 are formed on the side facing the under cladding 20-1. In addition, as shown in FIG. 4C, the directional couplers with variable coupling ratio 11-1 to 11-12 each include at the c-c cross section, a silicon substrate 19-2, an under cladding 20-2 and an over cladding 22-2 stacked in this order. In the over cladding 22-2, cores 21-3 and 21-4 are formed on the side facing the under cladding 20-2. On the over cladding 22-2, a thin film heater 23 is provided for controlling the refractive index of the waveguide of the core 21-3 by heating.

Varying the phase of the waveguide between 0 and $2\pi$ using the control section 18 enables the switching characteristics of the symmetrical Mach-Zehnder interferometer to set the power coupling ratio between the input and output ports at any desired value between 0 and 100%. If the power coupling ratio of the 3-dB directional coupler deviates from 50% because of a fabrication error and the like, it is difficult for the configuration of FIG. 4A to achieve any desired coupling ratio. In this case, replacing the single symmetrical Mach-Zehnder interferometer with a multi-stage configuration makes it possible to achieve any desired coupling ratio. Utilizing the symmetrical Mach-Zehnder interferometer configuration of FIG. 4A can implement an optical combiner and splitter. It is obvious that the optical combiner and splitter can also be constituted using a directional coupler configuration.

Returning to FIG. 2, the waveguide refractive index control sections 13-1 to 13-8 and 18 can utilize a thin film heater (thermooptic effect) or the like, when the waveguide to be controlled is composed of a glass waveguide or polymer waveguide. On the other hand, when the waveguide to be controlled is composed of a dielectric waveguide or semiconductor waveguide, they can utilize an electrode (electric optical effect) or the like.

As the optical amplifier 14, it is possible to use a rare earth doped optical fiber amplifier such as an erbium-doped optical fiber amplifier (EDFA), a rare earth doped optical waveguide, or a semiconductor laser optical amplifier (SOA).

As the optical pulse source 9, it is possible to use a semiconductor or optical fiber mode locked laser, a semiconductor gain switched light source, or a pulsed light generated by intensity modulation of a CW light source with a polymer or a dielectric such as LN, or a semiconductor EA modulator.

Figure 5A:
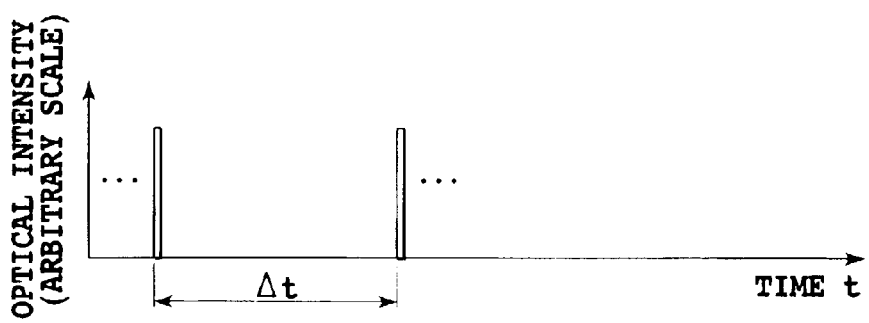
FIGS. 5A to 5E are diagrams illustrating the operation of the embodiment of the optical pulse pattern generator in accordance with the present invention.
Figure 5B:
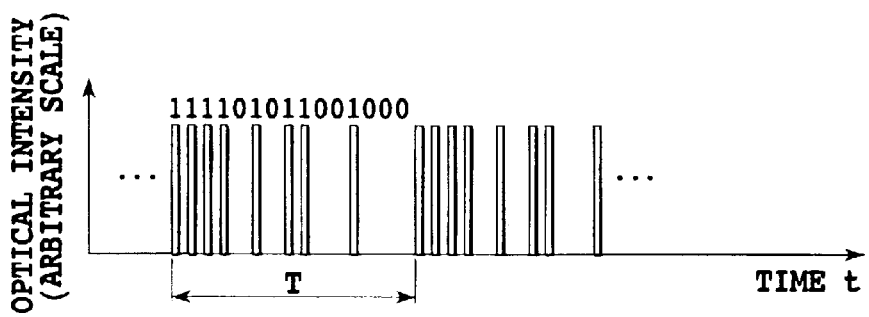
Figure 5C:
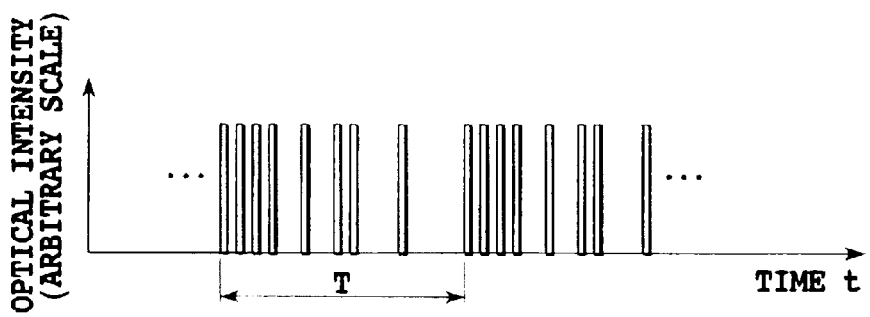
Figure 5D:
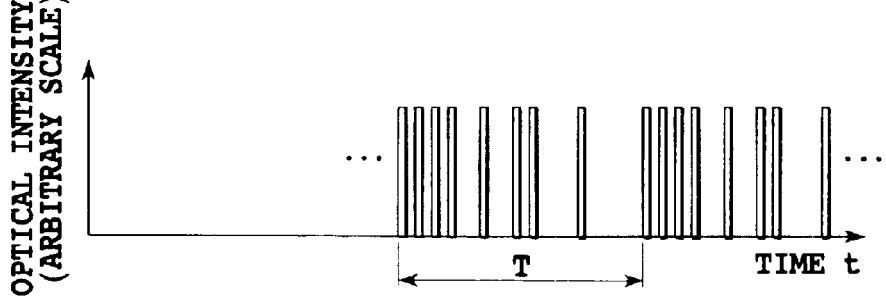

Next, by referring to FIGS. 5A to 5E, the operation of the optical pulse pattern generator as shown in FIG. 2 will be described in detail. FIG. 5A shows the output pulses (period Δt) of the optical pulse source 9. As the directional couplers with variable coupling ratio 11-1 to 11-5 and 11-7 to 11-11, a switching function whose coupling ratio is 0% or 100% is used. In addition, as the directional couplers with variable coupling ratio 11-6 and 11-12, a coupling ratio variable function is used. The length differences between upper and lower arms of each of the asymmetrical Mach-Zehnder interferometers shown in FIG. 2 are assumed to be ΔLj (j=1 to 6). In this case, it is possible for the path between the optical waveguide 10-6 and optical waveguides 10-20 and 10-21 and for the path between the optical waveguide 10-20 and optical waveguides 10-35 and 10-36 to have variable delay differences between arms ranging from zero to (ΔL1+ΔL2 +ΔL3) and from zero to (ΔL4+ΔL5+ΔL6) with a minimum unit ΔLj, respectively. In addition, intensities of the pulses arriving at the optical waveguides 10-21 and 10-36 can be made equal.

Incidentally, as for waveguide lengths except for those in the variable delay line sections, they are not mentioned in the description because they have no substantial relation to the operation of the present embodiment of the optical pulse pattern generator. However, adjustment of the waveguide lengths for enabling the operation shown in FIGS. 5A to 5E is carried out as needed (for example, the lengths at the portions of the optical waveguides 10-21 and 10-36 are made equal), which is easily achieved by using optical waveguide technology.

The symmetrical Mach-Zehnder interferometer 104, in which the phase difference between the optical waveguides 10-37 and 10-38 is set at π/2 by adjusting the optical path length in a wavelength size order in the design and fabrication process, or by driving the waveguide refractive index control section 13-8, can operate as an optical exclusive OR circuit. The relationships among the presence and absence of the input (x1) at the optical waveguide 10-21, and that of the input (x2) at the optical waveguide 10-36 and the output (y) at the optical waveguide 10-40 are summarized in Table 1.

TABLE 1

| x1 | x2 | y |
|----|----|---|
| 0  | 0  | 0 |
| 0  | 1  | 1 |
| 1  | 0  | 1 |
| 1  | 1  | 0 |

It is assumed here that the phase difference between the input optical pulses x1 and x2 supplied via the optical waveguides 10-21 and 10-36 are set at an integer multiple of 2π within a coherence length of the light source by controlling the optical path length in the wavelength size or smaller order in the design and fabrication process, or by operating at least one of the waveguide refractive index control sections 13-2 to 13-7 to adjust the phase of the lightwaves.

Table 1 shows that the output y is the exclusive OR of the inputs x1 and x2 satisfying the following expression (1). In expression (1), an overline indicates "not" of the digital signal. Such an optical exclusive OR function can be achieved by using the nonlinear optical effect of a semiconductor laser optical amplifier or the like.

$$y = \overline{x1}x2 + x1\overline{x2} = x1 \oplus x2 \quad (1)$$

The configuration shown in FIG. 2 having the exclusive OR function and feedback function constitutes a linear feedback shift register in an optical region. The optical amplifier 14 can compensate for the drops in the pulse intensity levels due to the waveguide loss and splitting.

FIGS. 5B, 5C, 5D and 5E illustrate behaviors of pulses at the optical waveguides 10-21, 10-36, 10-40 and 10-35 (output), respectively, when a delay La is given between the optical waveguide 10-6 and the optical waveguides 10-20 and 10-21, and a delay Lb is given between the optical waveguide 10-20 and the optical waveguides 10-35 and 10-36. Here, La={cT/(15n)−1} and Lb={(3cT/(15n)−1}, where 1 is the clockwise distance from the optical waveguides 10-21 and 10-36 to the optical waveguide 10-6. For example, the above delays can be achieved as follows.

ΔL1=ΔL4=cT/(15n)−3L−1,

ΔL2=ΔL3=ΔL5=ΔL6=cT/(15n),

La=ΔL1+3L,

Lb=ΔL4+ΔL5+ΔL6+3L

Incidentally, L represents lower arm length in each characteristic-variable asymmetrical Mach-Zehnder inferometer. We assumed that the lower arm lengths are equal in all the six interferometers. In addition, the effect of delay caused by unsubstantial waveguide lengths such as the distance from the optical waveguides 10-21 and 10-36 to the optical waveguide 10-40 is not shown in FIGS. 5A–5E. FIGS. 5A–5E show that a pulse pattern of M sequences (Maximum Length Shift Register Sequences) with period T and sequence length 15, that is, a typical random pulse train, can be implemented.

FIGS. 6A–6E illustrate the behaviors of the pulses when the delays Lb {=3cT/(15n)−1} and La {=cT/(15n)−1} are assigned to the path between the optical waveguide 10-6 and the optical waveguides 10-20 and 10-21 and to the path between the optical waveguide 10-20 and the optical waveguides 10-35 and 10-36, respectively. FIGS. 6A–6E show the behaviors at the same positions as those of FIGS. 5A–5E.

FIGS. 5A–5E and FIGS. 6A–6E show that the variable optical random pattern pulse train with a sequence length 15 (=$2^4$−1) can be obtained by using only four of the six delay devices (the conventional example uses 15 delay devices). The ratio of the number of the delay devices of the present embodiment to that of the conventional example decreases with an increase of the sequence length. This means that the advantage of the present configuration over the conventional example becomes conspicuous as the sequence length of the optical random pattern pulse train increases.

When the following expression (2) is satisfied, the pulses fed back from the optical waveguide 10-2 to the optical waveguide 10-6 do not collide with the pulses in the next period from the optical pulse source 9.

$$\Delta t = \frac{1}{f} \gg T \quad (2)$$

where f is the repetition frequency of the optical pulse source 9.

The optical pulse source satisfying the above condition can be implemented by a mode-locked fiber laser or the like. For example, an optical pulse source with a repetition frequency of 10 MHz and a pulse width of a few picoseconds has been implemented. When generating a pulse pattern with a pulse period of 10 ps (repetition frequency 100

GHz) and a sequence length of 15 (with a period of 150 ps and a repetition frequency of 6.7 GHz) by using the foregoing light source and silica-based waveguides (with group refractive index of about 1.5), the left-hand side of the inequality sign of the foregoing expression (2) becomes $\Delta t=1/f=10^5$ ps, and the right-hand side becomes T=150 ps. Thus, it is very easy to satisfy the condition of the expression (2).

Even if the condition of expression (2) is not satisfied, the operation as the optical pulse pattern generator is the same when the following conditions are satisfied: (1) $\Delta t=KT$, where K is a natural number; and (2) the phase of the optical pulses fed from the optical pulse source 9 differs from the phase of the feedback optical pulses by an integer multiple of $2\pi$ at the optical waveguide 10-6, because only the signal intensity of the "1" as digital signal increases in this case.

Second Embodiment

Figure 7:
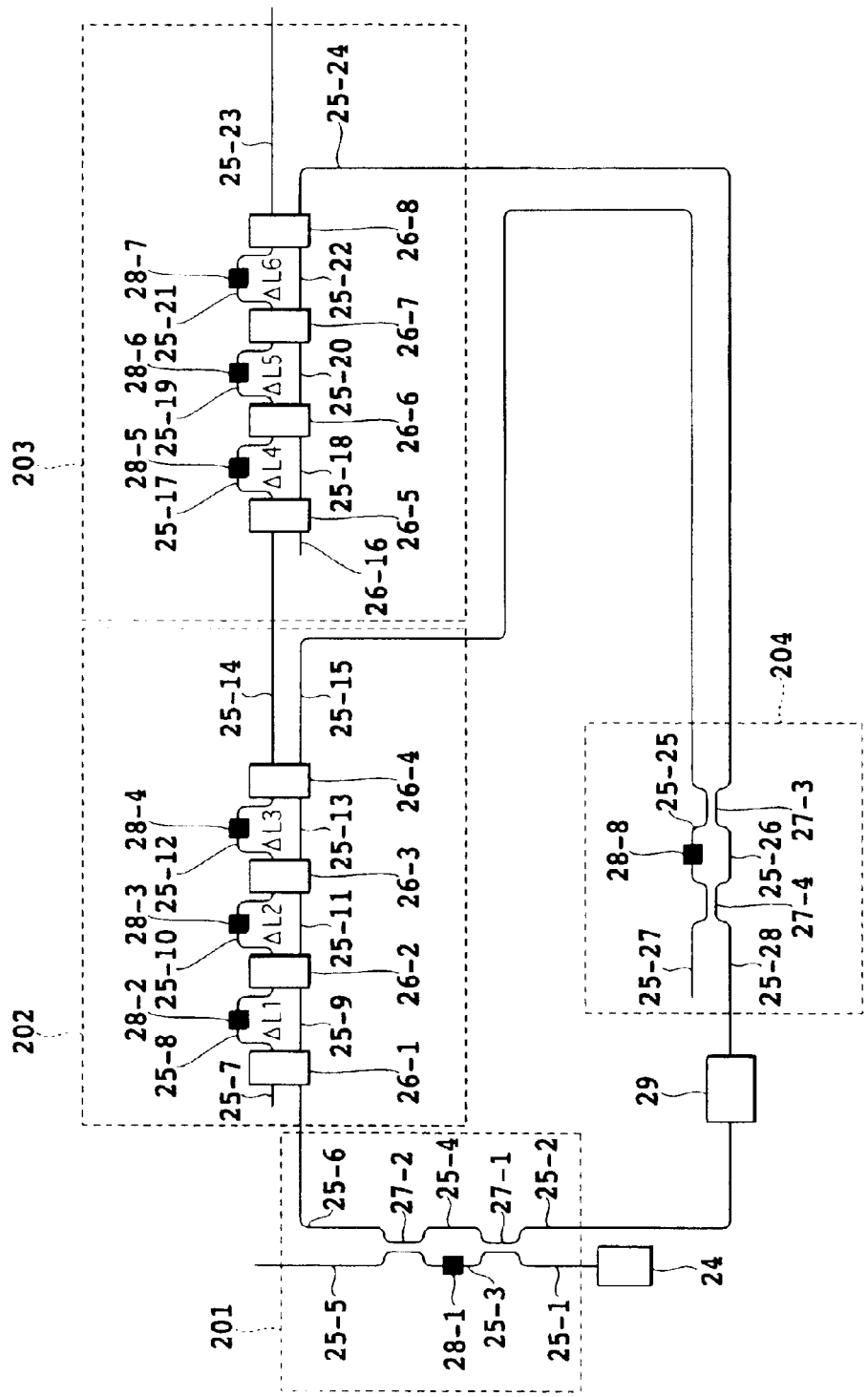
FIG. 7 is a block diagram showing a configuration of a second embodiment of the optical pulse pattern generator in accordance with the present invention.

FIG. 7 shows a second embodiment in accordance with the present invention. In this figure, the optical pulse source 24 is connected to a cascade connection of a first symmetrical Mach-Zehnder interferometer used as an optical combiner and splitter 201, and first and second cascade-connected characteristic-variable asymmetrical Mach-Zehnder interferometers 202 and 203. The two cascade-connected characteristic-variable asymmetrical Mach-Zehnder interferometers 202 and 203 have their final stages connected to the first symmetrical Mach-Zehnder interferometer 201 via a second symmetrical Mach-Zehnder interferometer used as an optical exclusive OR circuit 204 and an optical amplifier 29, thereby constituting a feedback loop. The number of stages in each of the cascade-connected characteristic-variable asymmetrical Mach-Zehnder interferometers 202 and 203 is three.

As shown in FIG. 7, the present embodiment of the optical pulse pattern generator comprises the optical pulse source 24, optical waveguides 25-1 to 25-28, directional couplers with variable coupling ratio 26-1 to 26-8, 3-dB directional couplers 27-1 to 27-4, waveguide refractive index control sections 28-1 to 28-8, and optical amplifier 29.

The cascade-connected characteristic-variable asymmetrical Mach-Zehnder interferometers 202 and 203 in FIG. 7 differs from the cascade-connected characteristic-variable asymmetrical Mach-Zehnder interferometers 102 and 103 in FIG. 2 in that the ports of the directional couplers with variable coupling ratio are connected via a pair of paths rather than via a single path.

For example, the cascade-connected characteristic-variable asymmetrical Mach-Zehnder interferometer 202 includes the four two-input/two-output directional couplers with variable coupling ratio 26-1 to 26-4. Then, the input side two-input/two-output directional coupler with variable coupling ratio (26-1, for example) has its two output ports connected to the two input ports of the output side two-input/two-output directional coupler with variable coupling ratio (26-2, for example) via the two optical waveguides (25-8 and 25-9, for example) with different lengths. Thus, the three characteristic-variable asymmetrical Mach-Zehnder interferometers are connected in series. As a result, the directional coupler with variable coupling ratio 26-2 is shared by the first stage characteristic-variable asymmetrical Mach-Zehnder interferometer and the second stage characteristic-variable asymmetrical Mach-Zehnder interferometer. Likewise, the directional coupler with variable coupling ratio 26-3 is shared by the second stage characteristic-variable asymmetrical Mach-Zehnder interferometer and the third stage characteristic-variable asymmetrical Mach-Zehnder interferometer.

The cascade-connected characteristic-variable asymmetrical Mach-Zehnder interferometer 203 also includes the four two-input/two-output directional couplers with variable coupling ratio 26-5 to 26-8. Then, the input side two-input/two-output directional coupler with variable coupling ratio (26-5, for example) has its two output ports connected to the two input ports of the output side two-input/two-output directional coupler with variable coupling ratio (26-6, for example) via the two optical waveguides (25-17 and 25-18, for example) with different lengths. Thus, the three characteristic-variable asymmetrical Mach-Zehnder interferometers are connected in series. As a result, the directional coupler with variable coupling ratio 26-6 is shared by the first stage characteristic-variable asymmetrical Mach-Zehnder interferometer and the second stage characteristic-variable asymmetrical Mach-Zehnder interferometer. Likewise, the directional coupler with variable coupling ratio 26-7 is shared by the second stage characteristic-variable asymmetrical Mach-Zehnder interferometer and the third stage characteristic-variable asymmetrical Mach-Zehnder interferometer.

Incidentally, the two cascade-connected characteristic-variable asymmetrical Mach-Zehnder interferometers 202 or 203 can be configured as a single characteristic-variable asymmetrical Mach-Zehnder interferometer.

The second embodiment also employs the switching functions with the coupling ratio of 0% or 100% in the directional couplers with variable coupling ratio 26-1 to 26-3 and 26-5 to 26-7 similarly in the configuration of FIG. 2. In addition, it uses variable coupling ratio functions in the directional couplers with variable coupling ratio 26-4 and 26-8. Thus, it is possible for the path between the optical waveguide 25-6 and optical waveguides 25-14 and 25-15 and for the path between the optical waveguide 25-14 and optical waveguides 25-23 and 25-24 to have variable delay differences between arms ranging from zero to ($\Delta L1+\Delta L2+\Delta L3$) and from zero to ($\Delta L4+\Delta L5+\Delta L6$) with a minimum unit $\Delta Lj$, respectively. In addition, intensities of the pulses arriving at the optical waveguides 25-15 and 25-24 can be made equal.

The second embodiment shown in FIG. 7 can achieve the same variable delay range by the configuration with a smaller number of directional couplers with variable coupling ratio than that in the configuration shown in FIG. 2. Thus, it offers an advantage of being able to further reduce the size and loss of the device. Since it can constitute the linear feedback shift register in the optical region, it can generate, similarly in the configuration of FIG. 2, the optical random pattern pulse trains with various periods and patterns at the optical waveguide 25-23 (output).

Third Embodiment

Figure 8:
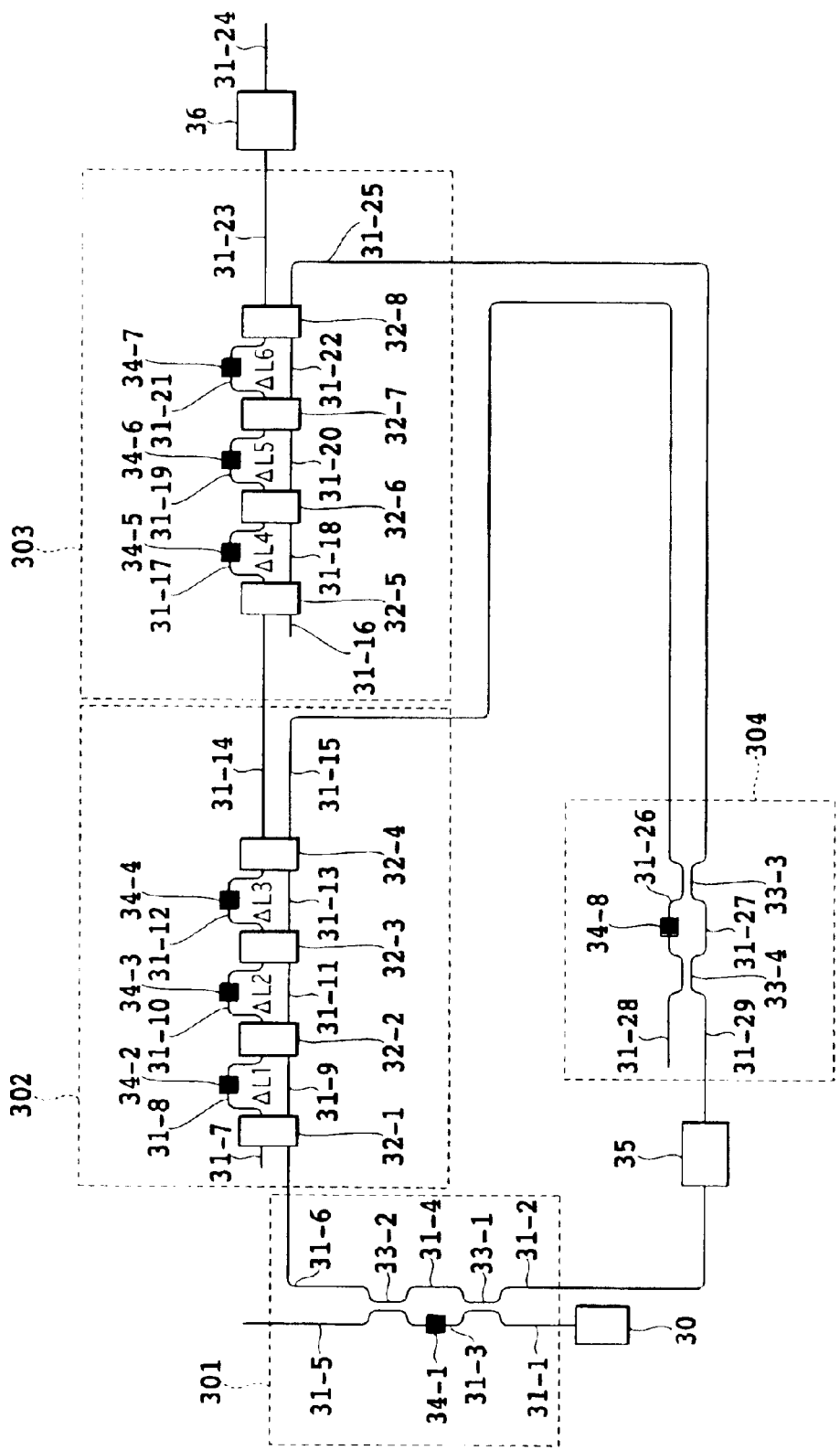
FIG. 8 is a block diagram showing a configuration of a third embodiment of the optical pulse pattern generator in accordance with the present invention.

FIG. 8 shows a third embodiment in accordance with the present invention. In this figure, the optical pulse source 30 is connected to a cascade connection of a first symmetrical Mach-Zehnder interferometer used as the optical combiner and splitter 301, and first and second cascade-connected characteristic-variable asymmetrical Mach-Zehnder interferometers 302 and 303 with the same configurations as those of FIG. 7. The two cascade-connected characteristic-variable asymmetrical Mach-Zehnder interferometers 302 and 303 each have their final stages connected to the first symmetrical Mach-Zehnder interferometer 301 via a second symmetrical Mach-Zehnder interferometer used as an optical exclusive OR circuit 304 and via an optical amplifier 35, thereby constituting a feedback loop. In addition, an optical gating device 36 is connected to the output of the second cascade-connected characteristic-variable asymmetrical Mach-Zehnder interferometer 303. The number of stages of each of the cascade-connected characteristic-variable asymmetrical Mach-Zehnder interferometers 302 and 303 is three.

As shown in FIG. 8, the present embodiment of the optical pulse pattern generator comprises the optical pulse source 30, optical waveguides 31-1 to 31-29, directional couplers with variable coupling ratio 32-1 to 32-8, 3-dB directional couplers 33-1 to 33-4, waveguide refractive index control sections 34-1 to 34-8, optical amplifier 35 and optical gating device 36.

Figure 5E:
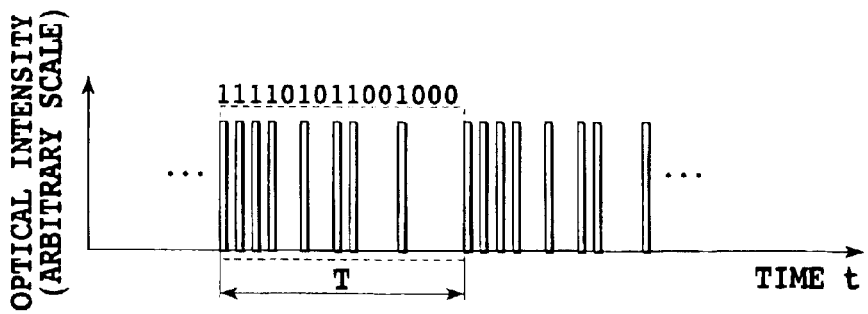
Figure 6A:
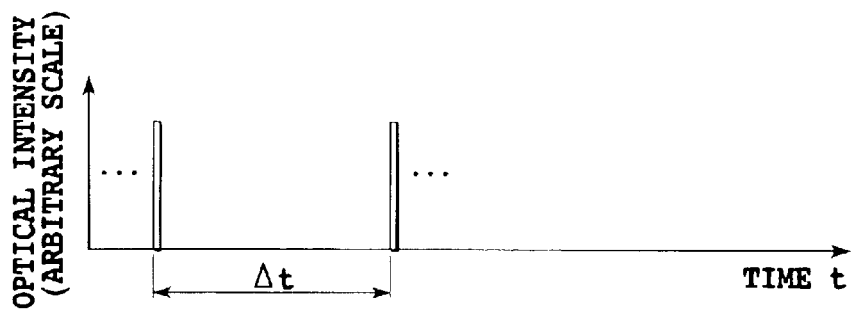
FIGS. 6A to 6E are diagrams illustrating the operation of the embodiment of the optical pulse pattern generator in accordance with the present invention.
Figure 6B:
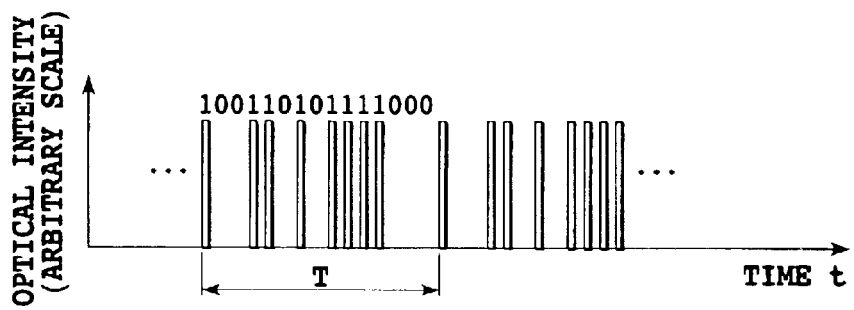
Figure 6C:
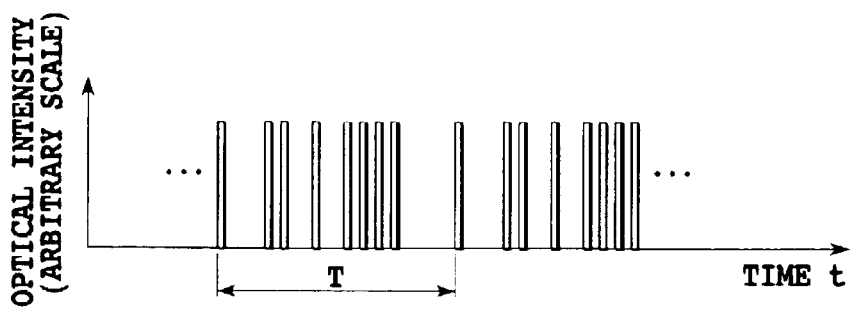
Figure 6D:
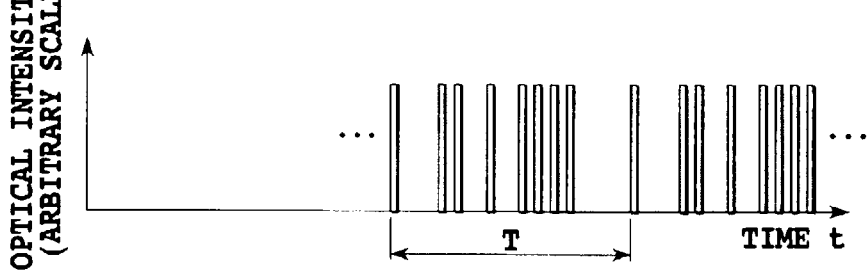
Figure 6E:
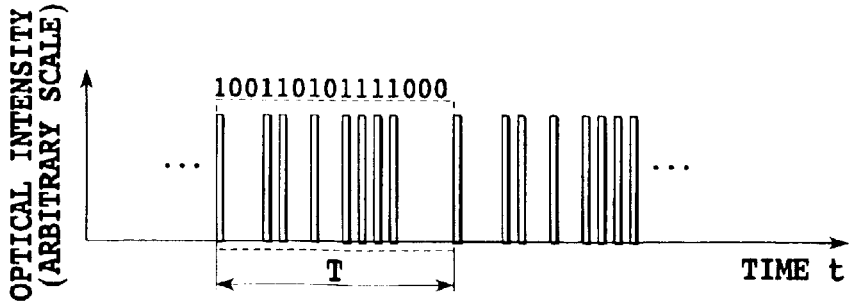

The configuration can generate optical random pattern pulse trains with various periods and patterns and output them from the optical waveguide 31-23 similarly in the configuration shown in FIG. 7. However, as for a pulse train for optical labeling unlike the optical random pattern pulse train for device evaluation, it is necessary to use a pulse train only during a single period such as that enclosed by broken lines in FIG. 5E, instead of the entire periodic random pattern as shown in FIG. 5E. For this reason, the optical gating device 36 is connected to the optical waveguide 31-23 for time gating to produce the desired pulse train from the optical waveguide 31-24. As the optical gating device 36, a dielectric (such as LN) or polymer intensity modulator, a semiconductor EA modulator, a semiconductor laser optical amplifier or the like can be used.

Variations

Although the foregoing first to third embodiments employ only one optical exclusive OR circuit 104, 204 or 304, this is not essential. For example, it is also possible to employ (M−1) two-input/two-output optical exclusive OR circuits for M cascade-connected characteristic-variable asymmetrical Mach-Zehnder interferometers, where M is an integer greater than two. In this case, a first output port of a previous optical exclusive OR circuit is connected to a first input port of the next optical exclusive OR circuit. Thus cascading a plurality of optical exclusive OR circuits can constitute a cascade-connected optical exclusive OR circuit.

For example, when the number of the cascade-connected characteristic-variable asymmetrical Mach-Zehnder interferometers constituting the variable optical delay line circuit is M, it is possible to use the cascade-connected optical exclusive OR circuit including (M−1) optical exclusive OR circuits connected in series. In this case, each second output port that is not yet connected in each cascade-connected characteristic-variable asymmetrical Mach-Zehnder interferometer constituting the variable optical delay line circuit is connected to each input port of the cascade-connected optical exclusive OR circuit.

In addition, although the foregoing first to third embodiments employ the optical waveguides 10-35, 25-23 and 31-23 as their outputs, this is not essential. For example, the optical waveguides 10-5, 25-5 and 31-5 can also be used as their outputs. Besides, the optical waveguides 10-39, 25-27 and 31-28 can be used as intensity inverted outputs.

Figure 9:
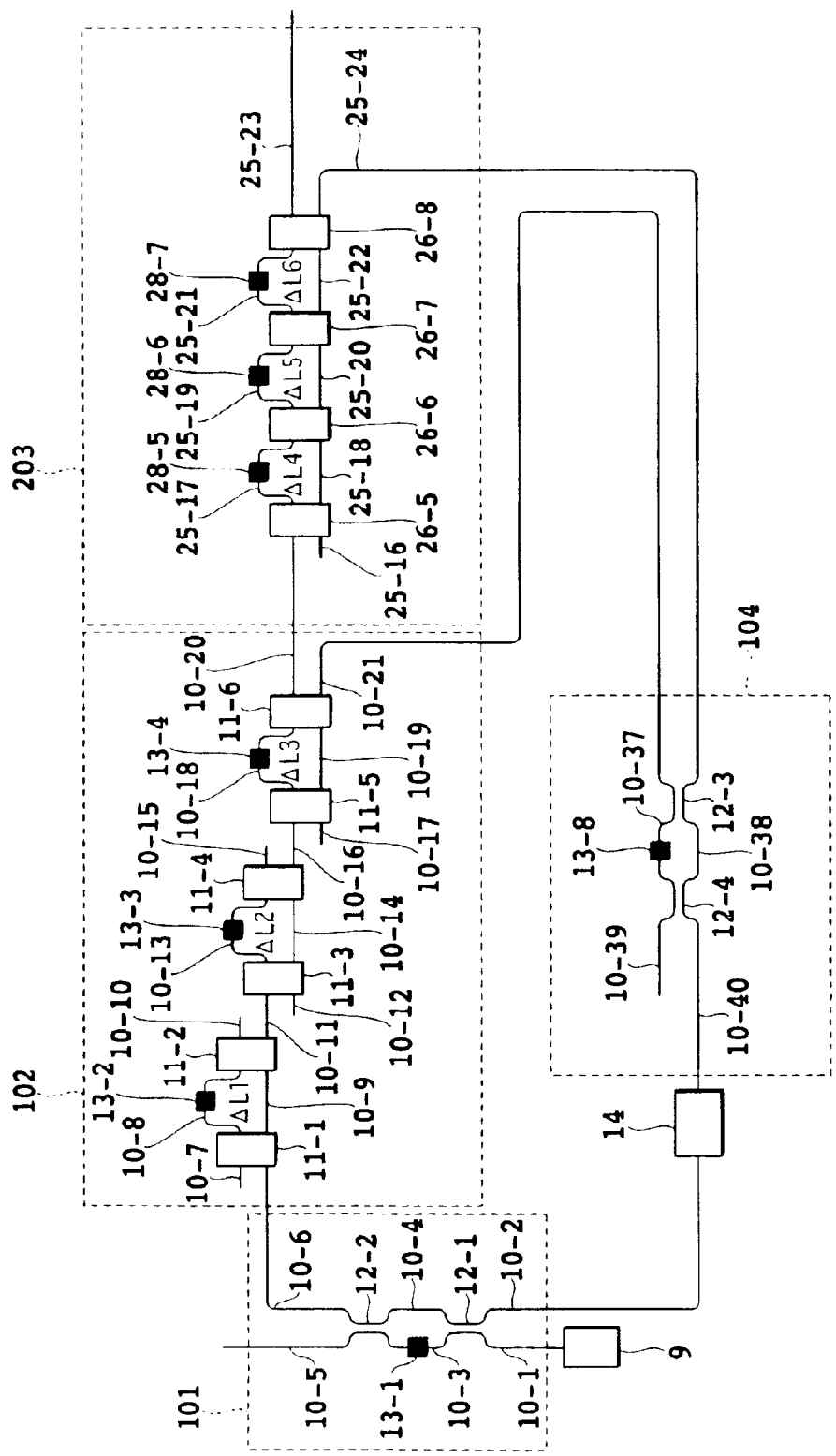
FIG. 9 is a block diagram showing a configuration of a variation of the embodiments of the optical pulse pattern generator in accordance with the present invention.

Furthermore, the cascade-connected characteristic-variable asymmetrical Mach-Zehnder interferometers 102, 103, 202, 203, 302 and 303 can be combined arbitrarily. For example, the cascade-connected characteristic-variable asymmetrical Mach-Zehnder interferometer 103 in the configuration of FIG. 2 can be replaced by the cascade-connected characteristic-variable asymmetrical Mach-Zehnder interferometer 203. FIG. 9 shows the optical pulse pattern generator arranged in this way.

Figure 10:
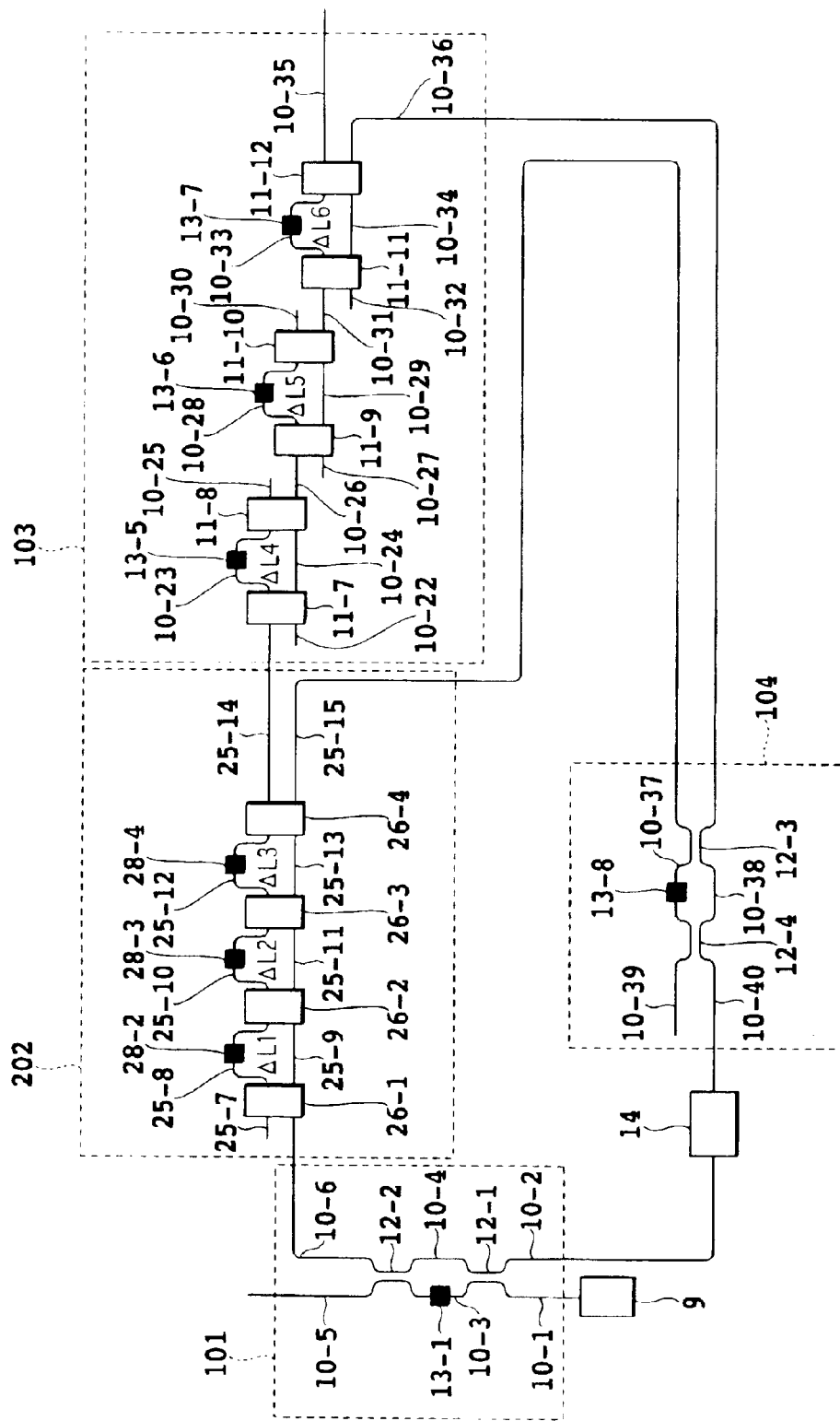
FIG. 10 is a block diagram showing a configuration of a variation of the embodiments of the optical pulse pattern generator in accordance with the present invention.

Also, the cascade-connected characteristic-variable asymmetrical Mach-Zehnder interferometer 102 in the example shown in FIG. 2 can be replaced by the cascade-connected characteristic-variable asymmetrical Mach-Zehnder interferometer 202. FIG. 10 shows the optical pulse pattern generator arranged in this way. Also, the cascade-connected characteristic-variable asymmetrical Mach-Zehnder interferometers 102 and 103 are applicable to the optical pulse pattern generators shown in FIGS. 7 and 8.

The optical waveguide portions constituting the embodiments of the optical pulse pattern generator in accordance with the present invention can be fabricated using silica glass waveguides. First, a $SiO_2$ under cladding layer is deposited on a Si substrate by a flame hydrolysis deposition method. Second, a core layer of $SiO_2$ glass to which $GeO_2$ is added as a dopant is deposited, followed by consolidation in an electric furnace. Third, the core layer is etched using the patterns shown in FIGS. 2 to 4, 7 to 10 to form the core portions. Finally, the $SiO_2$ over cladding is deposited, followed by consolidation, and further the thin film heaters and metal interconnections are evaporated on the prescribed optical waveguides.

Incidentally, the optical waveguide portions constituting the optical pulse pattern generator in accordance with the present invention are not limited to the glass optical waveguides. It is obvious that they can be implemented by using dielectric optical waveguides, semiconductor optical waveguides, polymer optical waveguides, or optical fibers or the like. In addition, it is also obvious that a hybrid-integrated configuration composed of a combination of two or more types of waveguides can also be implemented.

Although the optical pulse pattern generator in accordance with the present invention can be constituted by combining discrete optical pulse source, optical waveguides, optical amplifier and optical gating devices, it is obvious that it can be constituted by hybrid-integrating them.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An optical pulse pattern generator comprising:
an optical pulse source for generating an optical pulse;
an optical combiner and splitter having two inputs and two outputs, a first input of the two inputs being connected to said optical pulse source;
a variable optical delay line circuit having two inputs and two outputs and including a plurality of cascade-connected characteristic-variable asymmetrical Mach-Zehnder interferometers each of which has two inputs and two outputs, a first output of one of said cascade-connected characteristic-variable asymmetrical Mach-Zehnder interferometers being connected to a first input of another of said cascade-connected characteristic-variable asymmetrical Mach-Zehnder interferometers to form a cascade connection therebetween, and a first input of said variable optical delay line circuit being connected to a first output of said optical combiner and splitter; and
one or more optical exclusive OR circuits, and inputs of said optical exclusive OR circuits being connected to second outputs of said cascade-connected characteristic-variable asymmetrical Mach-Zehnder interferometers, wherein
a first output of said optical exclusive OR circuits is connected to a second input of said optical combiner and splitter.

2. The optical pulse pattern generator as claimed in claim 1, wherein said optical exclusive OR circuits are cascaded.

3. The optical pulse pattern generator as claimed in claim 1, wherein each of said optical exclusive OR circuits has two inputs and two outputs, and the number of said optical exclusive OR circuits is less than the number of said cascade-connected characteristic-variable asymmetrical Mach-Zehnder interferometers by one.

4. The optical pulse pattern generator as claimed in claim 1, wherein each of said cascade-connected characteristic-variable asymmetrical Mach-Zehnder interferometers includes at least one characteristic-variable asymmetrical Mach-Zehnder interferometer comprising:

a first directional coupler with variable coupling ratio having two inputs and two outputs; and a second directional coupler with variable coupling ratio having two inputs and two outputs connected to said first directional coupler with variable coupling ratio through two optical waveguides with different lengths.

5. The optical pulse pattern generator as claimed in claim 4, wherein a first output of one of said characteristic-variable asymmetrical Mach-Zehnder interferometers is connected to a first input of another of said characteristic-variable asymmetrical Mach-Zehnder interferometers to form a cascade connection of the two.

6. The optical pulse pattern generator as claimed in claim 4, wherein one of said first and second directional couplers with variable coupling ratio is used in common by two of said characteristic-variable asymmetrical Mach-Zehnder interferometers.

7. The optical pulse pattern generator as claimed in claim 1, further comprising at least one optical amplifier at a position on a light path.

8. The optical pulse pattern generator as claimed in claim 1, wherein said optical combiner and splitter consists of a symmetrical Mach-Zehnder interferometer.

9. The optical pulse pattern generator as claimed in claim 1, wherein each of said optical exclusive OR circuits consists of a symmetrical Mach-Zehnder interferometer.

10. The optical pulse pattern generator as claimed in claim 1, further comprising an optical gating device connected to an output of one of said variable optical delay line circuit, said optical combiner and splitter and said optical exclusive OR circuits.

11. An optical pulse pattern generator comprising:

an optical pulse source for generating an optical pulse;

an optical combiner and splitter connected to an output of said optical pulse source;

a variable optical delay line circuit connected to said optical combiner and splitter; and one or more optical exclusive OR circuits connected to said variable optical delay line circuit at intermediate stages and a final stage of said variable optical delay line circuit, wherein one output of said optical exclusive OR circuits is connected to said optical combiner and splitter.

12. An optical pulse pattern generating method of generating an optical random pattern pulse train from an optical pulse, said optical pulse pattern generating method comprising the steps of:

launching an optical pulse produced by an optical pulse source to a variable optical delay line circuit via an optical combiner and splitter, said variable optical delay line circuit including a plurality of cascade-connected characteristic-variable asymmetrical Mach-Zehnder interferometers;

supplying an optical pulse output from each of said cascade-connected characteristic-variable asymmetrical Mach-Zehnder interferometers to said optical combiner and splitter through one or more optical exclusive OR circuits; and producing a random pulse train from one of said variable optical delay line circuit, said optical combiner and splitter and said optical exclusive OR circuits by using said optical pulse supplied to said optical combiner and splitter.

* * * * *